United States Patent [19]

Yorita et al.

[11] Patent Number: 4,981,731

[45] Date of Patent: Jan. 1, 1991

[54] METHOD FOR GUNNING A REFRACTORY COMPOSITION

[75] Inventors: Eiichi Yorita; Takashi Yamamura, both of Okayama; Yukitoshi Kubota; Ichiro Hattori, both of Bizen, all of Japan

[73] Assignee: Shinagawa Refractories, Co., Ltd., Tokyo, Japan

[21] Appl. No.: 275,177

[22] PCT Filed: Feb. 13, 1987

[86] PCT No.: PCT/JP87/00094

§ 371 Date: Oct. 12, 1988

§ 102(e) Date: Oct. 12, 1988

[87] PCT Pub. No.: WO88/06263

PCT Pub. Date: Aug. 25, 1988

[51] Int. Cl.$^5$ .............................................. B05D 1/10
[52] U.S. Cl. .................................... 427/426; 427/427; 264/30
[58] Field of Search ................... 427/427, 426; 264/30

[56] References Cited

U.S. PATENT DOCUMENTS

| | | | |
|---|---|---|---|
| 4,461,789 | 7/1984 | Takashima | 427/426 |
| 4,535,001 | 8/1985 | Greener | 427/427 |
| 4,751,204 | 6/1988 | Kyoden et al. | 264/30 X |

FOREIGN PATENT DOCUMENTS

| | | | |
|---|---|---|---|
| 54-95615 | 7/1979 | Japan . | |
| 63-19795 | 4/1988 | Japan | 427/427 |

OTHER PUBLICATIONS

English (partial) translation of Japanese Kakai Patent Sho 54(1979)-95615.

*Primary Examiner*—Shrive Beck
*Attorney, Agent, or Firm*—Wenderoth, Lind & Ponack

[57] ABSTRACT

The present invention was developed to solve the problems inherent in conventional dry type and wet type gunning methods. The main point of the present invention is a novel method for gunning a refractory composition for obtaining a lining body having high density and high strength by premixing a refractory composition with water amounting to 1/5-¾ of the total amount of water for the lining, and subsequently adding and mixing the rest of the water at the inside of the gunning nozzle of the dry gunning equipment while gunning.

11 Claims, No Drawings

METHOD FOR GUNNING A REFRACTORY COMPOSITION

FIELD OF INDUSTRIAL USE

The present invention relates to a method for gunning a refractory composition to produce a lining body having high density and high strength.

PRIOR ART

Conventionally methods for gunning a monolithic refractory have been used in places where lining is difficult by casting or stamping. Gunning methods have such merits as no lining mold is needed, thereby enabling cost reduction, high working efficiency and easy hot lining and are therefore widely used. Gunning methods can roughly be divided into dry types and wet types. As they require a lot of water for lining compared with high density castable materials or stamping materials which use super fine powder and a dispersion agent as disclosed in Japanese Patent Publication No. 51-9770, Japanese Patent Application Laid Open No. 51-109008 and Japanese Patent Application Laid Open No. 52-58723, a refractory lining body obtained by gunning has high porosity, low density and deteriorated strength.

As a method for decreasing water for lining in a method for gunning, a dry type gunning method in which lining is carried out using a gunning material containing a surface active agent is disclosed in Japanese Patent Application Laid Open No. 58-24785. However, even this method requires move than 10% water for lining, and for this reason a sharp improvement in quality has not yet been achieved.

PROBLEMS TO BE SOLVED

Although the methods for applying said super fine powder and a dispersion agent of a high density castable material disclosed in the above described Japanese Patent Publication No. 51-9770, Japanese Patent Application Laid Open No. 51-109008 and Japanese Patent Application Laid Open No. 52-58723, were considered for application to a gunning method, in a dry type gunning method, as in the method for using said surface active agent, the time for mixing, and kneading the water for the lining and a gunning material at the gunning nozzle is very short so that a sufficient reduction in water can not be obtained and sharp improvements in quality of the lining body can not be expected.

On the other hand, when a gunning material containing super fine powder and a dispersion agent is used for lining by a wet type gunning method, since the gunning material is kneaded with the total amount of lining water, a sufficient effect of the dispersant can be obtained. However, when the total amount of water for lining is about the same as that of the high density casting material, the viscosity of the kneaded gunning material is high and the pressure pumping through a hose for the material is difficult. For this reason, it is necessary to increase the water for lining over that of the high dense casting material, so only a small improvement in quality of the lined body by gunning can be expected.

MEANS FOR SOLVING THE PROBLEMS

The object of the present invention is to resolve the above described problems, reduce the lining water in the method for gunning and obtain a lined body by gunning having high density and high strength.

Accordingly, the present invention presents a method for gunning a refractory composition composed of 93–60 wt. % refractory aggregate, 5–30 wt. % refractory super fine powder, 1–20 wt. % alumina cement and 0.01–0.5 wt. % (outer percentage) dispersion agent together with 0.01–2 wt. % (outer percentage) of a hardening accelerator characterized in that said refractory composition is previously mixed with water amounting to 1/5-¾ of the total amount of water for the gunning, is then conveyed under pressure by dry gunning equipment, a solution containing the remaining amount of water and the hardening accelerator being subsequently added to said mixed refractory composition at a gunning nozzle of said dry gunning equipment.

OPERATION

The refractory aggregates used in the present invention are such as calcined refractory clay, bauxite, sillimanite, mullite, alumina, silicon carbide, zircon, magnesia, chromite etc.. The preferable amount of addition for the refractory aggregates is 93–60 wt. %, amounts exceeding 93 wt. % not being preferable because suitable viscosity can not be obtained and amounts less than 60 wt. %, also not being preferable because lowering the porosity (high dentification) becomes difficult. One or more of the above described refractory aggregates can be used.

As for a refractory super fine powder, there is clay, kaolin, fine silica, fine alumina, fine zircon, fine magnesia, fine silicon carbide etc.. The grain size of the super fine refractory powder is preferably a fine powder of less than 50 μm. The amount of added refractory super fine powder is preferably 5–30 wt. % and if the amount of added refractory super fine powder exceeds 30 wt. %, high densification becomes difficult so it is not preferable, and if it is less than 5 wt. %, high densification also becomes difficult and suitable viscosity when gunning, can not be obtained so it is not preferable either. One or more of the above described refractory super fine powders can be used.

The alumina cement used for the refractory composition can be a hydraulic high alumina cement, JIS (Japanese Industrial Standard) alumina cement No. 1 and No. 2. The amount of alumina cement which is added is preferably 1–20 wt. %, added amounts of alumina cement exceeding 20 wt. %, not being preferable because the corrosion resistance decreases, and less than 1 wt. %, is not preferable because adequate strength can not be obtained. One or more of the above described alumina cements can be used.

The alkali metal phosphate which is used as a dispersant can be, for instance, sodium hexameta-phosphate, and as an alkali metal polyphosphate can be e.g. sodium ultrapolyphosphate etc.. The adding amount of dispersant is preferably 0.01–0.5 wt. % in outer %, added amounts of dispersant exceeding 0.5 wt. % not being preferable because the effect of dispersion decreases, and less than 0.01 wt. %, not being preferable because the appropriate dispersion effect can not be obtained one or more of said dispersant can be used.

To the refractory composition having said composition, 1/5-¾ of the necessary amount of water for the lining is added and by premixing in a mixer the super fine powder and alumina cement are partially dispersed to the state wherein a dispersion effect is perfectly obtained, even in short mixing times when the residual water for lining is added at the nozzle. Thus lining by gunning with low amounts of water is possible.

If the amount of water which is added and mixed in a mixer is less than 1/5 of the necessary amount of water for the lining, adequate dispersion effect can not be obtained, and if it exceeds ¾, the premixed refractory composition in a mixer becomes highly viscous, and pressure pumping in a dry-type gun becomes difficult.

By the effect of a hardening accelerator which is dissolved in the solution of residual water for lining and added at the nozzle, the lining by gunning can be carried out without flowing collapse of the lined body.

The hardening accelerator added at the nozzle, can be e.g. $Ca(OH)_2$, sodium silicates, sodium aluminate etc.. The adding amount of hardening accelerator is preferably 0.01-2 wt. % in outer %. If the added amount of hardening accelerator is less than 0.01 wt. %, the hardening speed is slow and therefore flowing collapse of the lined body occurs, and if it exceeds 2 wt. %, the hardening speed is fast and a stratified structure of the lined body is built, so it is not preferable.

The total amount of water for lining of the present invention is preferably 4-10 wt. %. Amounts of lining water less than 4 wt. %, are not preferable because the appropriate viscosity can not be obtained, and amounts exceeding 10 wt. % are not preferable because high densification is difficult.

The method for gunning a refractory composition of the present invention can be applied for various uses such as e.g. cold gunning repairs for inner walls of torpedo cars, gunning repairs for blast furnace troughs, and molten iron receiving mouths of torpedo cars, hot gunning repairs for blast furnaces, ladles, CDQ furnaces, RH type vacuum degassing equipment, pelletizing furnaces etc.. In these cases, e.g. in cold gunning repairs for inner walls of a torpedo car, alumina-silica series or alumina-silica-silicon carbide series refractory compositions can be used, in hot gunning repair for blast furnaces, alumina-silica series refractory compositions can be used, for ladles, zircon series or alumina-silica series refractory compositions can be used, in CDQ furnaces, clay series or high alumina series refractory compositions can be used and in RH type vacuum degassing equipment and in pelletizing furnaces, high alumina series refractory compositions can be used.

EXAMPLES

The present invention will now be described in further detail by means of the following examples.

EXAMPLE 1

A refractory composition having the composition ratio described in Table 1, was gunned to a vertical iron panel to a 150 mm lining thickness according to the gunning method of the present invention, a conventional dry type gunning method, and a conventional gunning method.

The characteristics of the obtained gunned lining body are shown in Table 1.

TABLE 1

|  |  | Present invention gunning Method | Conven. Dry type gunning Method | Conventional gunning Method |
|---|---|---|---|---|
| Composition (wt. %) | Calcined fire clay | 78 | 78 | 78 |
|  | Sintered alumina | 5 | 5 | 5 |
|  | Alumina super fine powder | 8 | 8 | 5 |
|  | Silica super fine powder | 3 | 3 |  |
|  | Aluminum cement | 6 | 6 | 12 |
|  | Dispersant (outer %) | 0.1 | 0.1 |  |
|  | Hardening accelerator (outer %) | 0.5* | 0.5 | 0.5 |
| Pre-mixed water (%) |  | 4 |  |  |
| Total water for lining by gunning (%) |  | 8 | 14 | 16 |
| Adhesion rate (%) |  | 93 | 92 | 89 |
| Quality of line body | Apparent porosity (%) |  |  |  |
|  | 110° C./24 hrs. | 16.0 | 26.0 | 31.0 |
|  | 1500° C./3 hrs. | 20.0 | 29.0 | 35.0 |
|  | Bending strength (kg/cm$^2$) |  |  |  |
|  | 110° C./24 hrs. | 90 | 30 | 25 |
|  | 1500° C./3 hrs. | 150 | 80 | 70 |

Note:
*added at nozzle, as a solution
Dispersant: Sodium ultrapolyphosphate
Hardening accelerator: Sodium silicate From Table 1, it is clear that the lined body obtained by the gunning method of the present invention is a dense lined body. It has a low apparent porosity and almost 2 or more times stronger in bending strength than those obtained by the conventional dry type gunning method or conventional gunning method.

EXAMPLE 2

A refractory composition having the composition ratio described in Table 2, was gunned to a vertical iron panel to a 150 mm lining thickness according to the gunning method of the present invention, a conventional dry type gunning method, and a conventional gunning method.

The characteristics of the gunned lining body are shown in Table 2.

TABLE 2

|  |  | Method for gunning present invention | Method for gunning Conventional Dry type | Method for gunning conventional |
|---|---|---|---|---|
| Composi- | Sinterd alumina | 75 | 75 | 75 |

TABLE 2-continued

| | | Method for gunning present invention | Method for gunning Conventional Dry type | Method for gunning conventional |
|---|---|---|---|---|
| tion (wt. %) | Silicon carbide | 15 | 15 | 15 |
| | Silicon carbide super fine powder | 2 | 2 | |
| | Alumina super fine powder | 4 | 4 | |
| | Silica super fine powder | 1 | 1 | |
| | Alumina cement | 3 | 3 | 10 |
| | Dispersant (outer %) | 0.1 | 0.1 | |
| | Hardening accelerator (outer %) | 0.1* | 0.1 | 0.1 |
| Pre-mixed water (%) | | 4.0 | | |
| Total water for lining by gunning (%) | | 6.0 | 11.0 | 14.0 |
| Adhesion rate (%) | | 91 | 90 | 92 |
| Quality of lined body | Apparent porosity (%) | | | |
| | 110° C./24 hrs. | 16.0 | 24.0 | 27.0 |
| | 1500° C./3 hrs. | 19.0 | 27.0 | 32.0 |
| | Bending strength (kg/cm$^2$) | | | |
| | 110° C./24 hrs. | 80 | 30 | 20 |
| | 1500° C./3 hrs. | 130 | 90 | 80 |

Note:
*added at a nozzle, as a solution
Dispersant: Sodium hexametaphosphate
Hardening accelerator: Ca(OH)$_2$ From Table 2, it is clear that the lined body obtained by the gunning method of the present invention is a dense lined body has a low apparent porosity and is almost 2 or more times stronger in bending strength than those obtained by the conventional dry type gunning method or conventional gunning method.

EFFECT OF THE INVENTION

By the method of the present invention, the following effects can be obtained.

(1) A gunned lined body with a high density and high strength can be obtained compared with those obtained by conventional methods, because the amount of lining water can be reduced sharply.

(2) Corrosion resistance improves, because the lined body with high density and high strength can be obtained and even the mixing ratio of the binder, which easily vitrifies at high temperature (e.g. alumina cement etc.), is reduced compared with a conventional gunning material.

(3) The constitution of gunned lined body becomes uniform due to pre-mixing.

(4) Dust generation when gunning, is very negligible due to pre-mixing.

We claim:

1. A method for gunning a refractory composition composed of 93-60 wt. % refractory aggregate, 5-30 wt. % refractory super fine powder, 1-20 wt. % alumina cement and 0.01-0.5 wt. % (outer percentage) dispersion agent together with 0.01-2 wt. % (outer percentage) of a hardening accelerator characterized in that said refractory composition is first mixed with water amounting to 1/5-¾ of the total amount used for the gunning, then conveyed under pressure by dry gunning equipment and then a solution containing the remaining amount of water and the hardening accelerator is added to said mixed refractory composition at a gunning nozzle of said dry gunning equipment wherein the total amount of water for the gunning is not more than 10% (outer percentage) of said refractory composition.

2. A method for gunning a refractory composition according to claim 1, wherein said refractory aggregate is composed of one or more components selected from the group consisting of fired refractory clay, bauxite, sillimanite, mullite, alumina, silicon carbide, zircon, magnesia and chromite.

3. A method for gunning a refractory composition according to claim 1, wherein the refractory super fine powder is composed of one or more components selected from a group consisting of clay, kaolinite, fine silica, fine alumina, fine zircon, fine magnesia and fine silicon carbide.

4. A method for gunning a refractory composition according to claim 3, wherein the grain size of the refractory super fine power does not exceed 50 μm.

5. A method for gunning a refractory composition according to claim 1, wherein the dispersion agent is composed of one or more components selected from the group consisting of alkali phosphates and alkali polyphosphates.

6. A method for gunning a refractory composition according to claim 5, wherein the alkali phosphate is sodium hexametaphosphate.

7. A method for gunning a refractory composition according to claim 5, wherein the alkali polyphosphate is sodium ultrapolyphosphate.

8. A method for gunning a refractory composition according to claim 1, wherein the hardening accelerator is composed of one or more components selected from the group consisting of calcium hydroxide, sodium silicate and sodium aluminate.

9. A method for gunning a refractory composition according to claim 1, wherein the alumina cement is composed of one or more components selected from the group consisting of hydraulic high alumina cement, JIS (Japanese Industrial Standard) alumina cement No. 1 and No. 2.

10. A method for gunning a refractory composition composed of 93-60 wt. % refractory aggregate, 5-30 wt. % refractory super fine powder, 1-20 wt. % alumina cement and 0.01-0.5 wt. % (outer percentage) of a dispersion agent together with 0.01-2 wt. % (outer percentage) of a hardening accelerator characterized in that said refractory composition is first mixed with water amounting to 1/5-¾ of the total amount used for the gunning, then conveyed under pressure by dry gunning equipment and then a solution containing the remaining amount of water and the hardening accelerator is added to said mixed refractory composition at a gunning nozzle of said dry gunning equipment, wherein the total amount of water for the gunning is not more than 10% (outer percentage) of said refractory composition, said refractory aggregate being composed of one or more components selected from the group consisting of fired refractory clay, bauxite, sillimanite, mullite, alumina, silicon carbide, zircon, magnesia and chromite, said refractory super fine powder being composed of one or more components selected from the group consisting of clay, kaolinite, fine silica, fine alumina, fine zircon, fine magnesia and fine silicon carbide, said dispersion agent being composed of one or more components selected from the group consisting of alkali phosphates and alkali polyphosphates, said hardening accelerator being composed of one or more components selects from the group consisting of calcium hydroxide, sodium silicate and sodium aluminate and said alumina cement being composed of one or more components selected from the group consisting of hydraulic high alumina cement, and JIS (Japanese Industrial Standard) alumina cement No. 1 and No. 2.

11. A method for gunning a refractory composition according to claim 10, wherein the grain size of the refractory super fine powder does not exceed 50 μm.

* * * * *